US006384172B1

(12) United States Patent
Dvornic et al.

(10) Patent No.: US 6,384,172 B1
(45) Date of Patent: May 7, 2002

(54) HYPERBRANCHED POLYCARBOSILANES, POLYCARBOSILOXANES, POLYCARBOSILAZENES AND COPOLYMERS THEREOF

(75) Inventors: Petar R. Dvornic; Jin Hu; Dale J. Meier; Robert M. Nowak, all of Midland, MI (US)

(73) Assignee: Michigan Molecular Institute, Midland, MI (US)

( * ) Notice: Subject to any disclaimer, the term of this patent is extended or adjusted under 35 U.S.C. 154(b) by 0 days.

(21) Appl. No.: 09/753,380

(22) Filed: Jan. 2, 2001

(51) Int. Cl.$^7$ .............................................. C08G 77/06
(52) U.S. Cl. .............................. 528/15; 528/31; 528/32
(58) Field of Search .............................. 528/15, 31, 32

(56) References Cited

U.S. PATENT DOCUMENTS

| | | |
|---|---|---|
| 5,418,301 A | 5/1995 | Hult et al. |
| 5,739,218 A | 4/1998 | Dvornic et al. |
| 5,902,863 A | 5/1999 | Dvornic et al. |
| 5,938,934 A | 8/1999 | Balogh et al. |
| 6,100,350 A | 8/2000 | Wilczek et al. |
| 6,107,408 A | 8/2000 | Quirk et al. |

FOREIGN PATENT DOCUMENTS

WO     WO98/30604     7/1998

OTHER PUBLICATIONS

Frechet et al., "New Hyperbranched Poly(Siloxysilanes): Variation of the Branching Pattern and End–Functionalization", Macromolecules (1998), 31(11), 3461 (abstract).

Newkome, G.R, Baker, G.R.; "Macromolecular Nomenclature Note No. 7", Polymer Preprints, vol. 35, No. 2, Aug. 1994, American Chemical Society, Jul. 5, 1994, pp. 6–9.

Gopala, A., Wu, H., Xu, J, Heiden, P.; "Investigation of Readily Processable Thermoplastic–Toughened Thermosets: IV. BMIs Toughened with Hperbranched Polyester", Journal of Applied Polymer Science, vol. 71, 1999, pp. 1809–1817.

Wu, H., Xu, J. , Liu, Y., Heiden, P.; "Investigation of Readily Processable Thermoplastic–Toughened Thermosets. V. Epoxy Resin Toughened with Hyperbranched Polyester", Journal of Applied Polymer Science vol. 72, 1999, pp. 151–163.

Boogh, L., Pettersson, B., Japon, S., Månson, J.–A.; "A Novel Toughening System for Thermoset Resins and its Composites"; Proceedings of ICCM–10, Whistler, B.C., Canada, Aug. 1995; pp. VI–389—VI–396.

Litt, M., Levy, A., Herz, J.; "Polymerization of Cyclic Imino Ethers. X., Kinetics, Chain Transfer, and Repolymerization"; J. Macromol., Sci.–Chem..; A9(5), 1975, pp. 703–727.

Kienle, R.H., Van Der Meulen, P.A., Petke, F.E.; "The Polyhydric Alcohol–Polybasic Acid Reaction. III. Further Studies of the Glycerol–Phthalic Anhydride Reaction[1]"; The Glycerol–Phthalic Anhydride Reaction; vol. 61; Sep. 1939; pp. 2258–2268.

Kienle, R.H., Hovey A.G., "The Polyhydric Alcohol–Polybasic Acid Reaction. I. Glycerol–Phthalic Anhydride"; The Polyhydric Alcohol–Polybasic Acid Reaction; vol. 51, Feb., 1992; pp. 509–519.

Emrick, T., Chang, H.–T., Fréchet, M.J.; "An $A_2+B_3$ Approach to Hyperbranched Aliphatic Polyethers Containing Chain End Epoxy Substituents"; Macromolecules; vol. 32; No. 19; 1999; pp. 6380–6382.

Malmström, E., Johansson, M., Hult, A.; "Hyperbranched Aliphatic Polyesters"; Marcromolecules; vol. 28; No. 5; 1995; pp. 1698–1703.

Dvornic, P.R., Tomalia, D.A.; "Molecules That Grow Like Trees"; Science Spectra; No. 5, 1996; pp. 36–41.

Miravet, J.F., Fréchet, J.M.J.; "New Hyperbranched Poly(siloxysilanes) from $AB_2$, $AB_4$ and $AB_6$ monomers: Variation of the Branching Pattern and End–Functionalization"; Polymeric Materials Science and Engineering; vol. 77, Fall Meeting Sep. 8–11, 1997, Las Vegas Neveda; Proceedings of the American Chemical Society Division of Polymeric Materials: Science and Engineering; 1997; pp. 141–142.

Mathias, L.J., Carothers, T.W.; "Hyperbranched Poly(siloxysilanes)"; J. Am. Chem. Soc.; vol. 113; 1991, pp. 4043–4044.

Lach, C., Müller, P., Frey, H., Mülhaupt, R., "Hyperbranched Polycarbosilane Macromonomers Bearing Oxazoline Functionalities"; Macromol. Rapid Commun.; vol. 18, 1997, pp. 253–260.

Rubinsztajn, S., "Synthesis and Characterization of New Poly(siloxysilanes)[1]"; Journal of Inorganic and Organometallic Polymers, vol. 4, No. 1; 1994; pp. 61–77.

Rubinsztajn, S., Stein, J.; "A Silane Functionalized Styrene Monomer and Its Polymerization"; Journal of Inorganic and Organometallic Polymers; vol. 5, No. 1; 1995. 43–59.

Mishra, M., Kobayashi, S.; "Star and Hyperbranched Polymers", Copyright© 1999 by Marcel Dekker, Inc, one page.

Primary Examiner—Robert Dawson
Assistant Examiner—Marc S. Zimmer
(74) Attorney, Agent, or Firm—Price, Heneveld, Cooper, DeWitt & Litton

(57) ABSTRACT

Hyperbranched polycarbosilanes, polycarbosiloxanes, polycarbosilazenes and copolymers thereof are prepared by reacting a difunctional or polyfunctional monomer having functional groups of one type (A) without any other functional groups capable of reacting significantly during polymerization, and a difunctional or polyfunctional monomer having functional groups of another type (B) without any other functional groups capable of reacting significantly during polymerization, wherein each A-functional group is reacted with a B-functional group, and wherein at least one of the monomers has a functionality of at least three. The process enables hyperbranched polycarbosilanes, polycarbosiloxanes, polycarbosilazenes and copolymers thereof to be prepared at a lower cost than with conventional synthesis processes, and provides greater flexibility in the preparation of a larger variety of different types of hyperbranched polycarbosilanes, polycarbosiloxanes, polycarbosilazenes and copolymers thereof.

8 Claims, No Drawings

HYPERBRANCHED POLYCARBOSILANES, POLYCARBOSILOXANES, POLYCARBOSILAZENES AND COPOLYMERS THEREOF

FIELD OF THE INVENTION

This invention relates to the synthesis of polymers from polyfunctional monomers, and more particularly to the synthesis of branched polycarbosilanes, polycarbosiloxanes, polycarbosilazenes and copolymers thereof.

BACKGROUND OF THE INVENTION

Silicon-containing polymers, such as polycarbosilanes, polycarbosiloxanes, polycarbosilazenes and copolymers thereof, are typically synthesized from difunctional monomers to produce linear polymers, or from a combination of difunctional and polyfunctional monomers to prepare thermoset resins. Thermoplastic and thermoset polycarbosilanes, polycarbosiloxanes, polycarbosilazenes and copolymers thereof are used in a variety of applications. Liquid polycarbosilanes, polycarbosiloxanes, polycarbosilazenes and copolymers thereof are used as adhesives, lubricants, protective coatings, coolants, mold-release agents, dielectric fluids, heat transfer fluids, wetting agents, water-repellents, polishes, etc. Resinous polycarbosilanes, polycarbosiloxanes, polycarbosilazenes and copolymers thereof are used in coatings, molding compounds, sealants, room-temperature curing cements, modifiers for alkyd resins, etc. Elastomeric polycarbosilanes, polycarbosiloxanes, polycarbosilazenes and copolymers thereof are used for encapsulation of electronic parts, gaskets, surgical membranes, etc. However, there is a recognized need for branched, and more particularly for highly branched polycarbosilanes, polycarbosiloxanes, polycarbosilazenes and copolymers thereof. It is know that chemically similar polymers having different molecular architectures can exhibit different properties and advantages. For example, polymer-coating compositions comprising a highly branched polymer have a lower viscosity and better shear-thinning properties for coating applications than similar compositions containing a chemically similar linear polymer having the same molecular weight and same concentration.

One method of synthesizing branched polymers is to use polyfunctional monomers (i.e., monomers having three or more functional groups) during polymerization. However, this method may result in the production of gelled or thermoset cross-linked materials that do not exhibit good processability characteristics, and which are insoluble.

It has been suggested that dendrimers can be employed in certain applications to achieve improved properties, such as thermoplastic processing characteristics, lower viscosity, and improved rheology, as compared with linear polymers having similar chemistry and molecular weight. However, dendrimers are almost monodisperse (typically having a polydispersity of less than about 1.02), highly defined molecules that are prepared by a series of controlled stepwise growth reactions which generally involve protect-deprotect strategies and purification procedures at the conclusion of each step. As a consequence, synthesis of dendrimers is a tedious and expensive process that places a practical limitation on their applicability.

In contrast to dendrimers, hyperbranched polymers can be prepared in a one-step, one-pot procedure. This facilitates the synthesis of large quantities of materials, at high yields, and at a relatively low cost. Although the properties of hyperbranched polymers are different from those of dendrimers due to imperfect branching and larger polydispersities, hyperbranched polymers exhibit a degree of branching intermediate between that of linear polymers and dendrimers, and, therefore, exhibit thermoplastic processing and rheological properties that are comparable, or for some applications superior, to those of dendrimers. Accordingly, hyperbranched polymers have been perceived as being useful in certain applications as a lower cost alternative to dendrimers.

Heretofore, hyperbranched polymers, including hyperbranched polycarbosilanes, polycarbosiloxanes, polycarbosilazenes and copolymers thereof, have been prepared using a monomer having at least one functionality of one type (A), and at least two functionalities of another type (B), wherein functionalities of the same type are not reactive with each other, and functionalities of the first type are reactive with functionalities of the second type to form hyperbranched polymers via condensation or addition reactions. The monomers employed during synthesis of conventional hyperbranched polymers are generally designated as $A_x B_y$ monomers, wherein A represents a functional group of a first type that does not react with itself, B represents a functional group of a second type that does not react with itself but reacts with the functional groups of the first type, x is at least 1, and y is at least 2. However, there are relatively few commercially available $A_x B_y$ monomers, and synthesis of such monomers is generally more difficult than synthesis of monomers having a single type of functionality. As a result, the variety of hyperbranched polymers that can be synthesized from $A_x B_y$ monomers is limited, and although they are generally less expensive than dendrimers they are often too expensive for many applications.

SUMMARY OF THE INVENTION

This invention provides hyperbranched polycarbosilanes, polycarbosiloxanes, polycarbosilazenes and copolymers thereof prepared from difunctional and/or polyfunctional monomers having functional groups of one type (A) without any other functional groups that react significantly during the polymerization process, and difunctional and/or polyfunctional monomers having functional groups of another type (B) that react with a functional group of the first type (A) without any other functional groups that react significantly during the polymerization process. More specifically, the hyperbranched copolymers of this invention are prepared by a process in which a monomer having the form $A_x$ is reacted with another monomer of the form $B_y$, where A is a functional group that does not react with itself during the polymerization process, B is a functional group that does not react with itself during the polymerization process but participates in an addition or condensation reaction with a first functional group (A) to form a hyperbranched copolymer, x and y are integers which each have a value of at least 2, and at least one of x and y is an integer having a value of at least 3.

The process of this invention enables synthesis of hyperbranched polycarbosilanes, polycarbosiloxanes, polycarbosilazenes and copolymers thereof from comonomers, each of which has a single type of functional group, thereby providing greater flexibility in the preparation of a larger variety of different hyperbranched polycarbosilanes, polycarbosiloxanes, polycarbosilazenes and copolymers thereof. Because $A_x$ and $B_y$ type monomers are easier to synthesize than $A_x B_y$ type monomers, the process of this invention also enables hyperbranched polycarbosilanes, polycarbosiloxanes, polycarbosilazenes and copolymers thereof to be prepared at a lower cost than with conventional synthesis processes.

These and other features, advantages and objects of the present invention will be further understood and appreciated by those skilled in the art by reference to the following specification and claims.

DESCRIPTION OF THE PREFERRED EMBODIMENTS

This invention is directed to hyperbranched polycarbosilanes, polycarbosiloxanes, polycarbosilazenes and copolymers thereof prepared by reacting at least two different monomers, each of which will not react with itself, but will react with the other monomer, wherein at least one of the monomers includes at least three functional groups, and the other monomer is at least difunctional. It should be understood that the $A_x$ and $B_y$ monomers may contain other groups that are potentially reactive in other ways. Accordingly, it will be understood that an $A_x$ monomer does not include any functional groups, other than the A-functional groups, that will react appreciably or significantly during polymerization reaction. Similarly, the $B_y$ monomers will not contain any functional groups, other than the B-functional groups, that will react appreciably or significantly, during polymerization reaction. This requirement does not exclude the possibility of having functional groups that are potentially reactive under conditions other than those in which the polymerization is conducted, and does not exclude monomers having groups that are insignificantly reactive under polymerization conditions, i.e., other functional groups that are not reactive to an extent that prevents formation of a desired hyperbranched polymer. This process may be represented by the following example when x=2 and y=3:

a) if b/a>1:

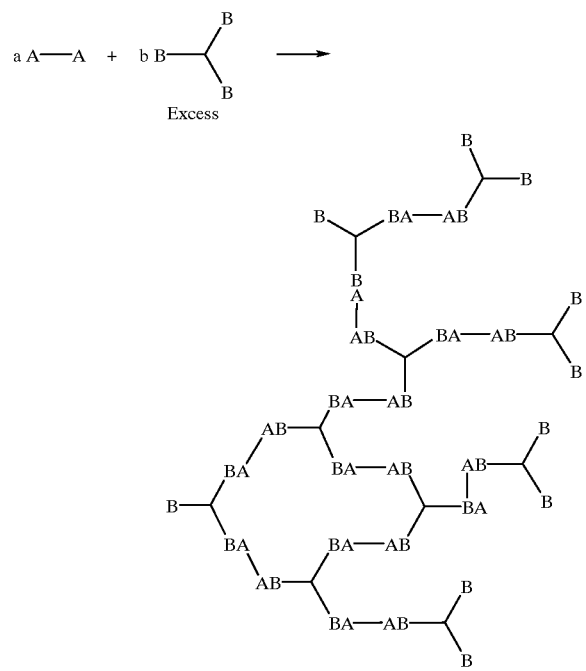

b) if b/a<1:

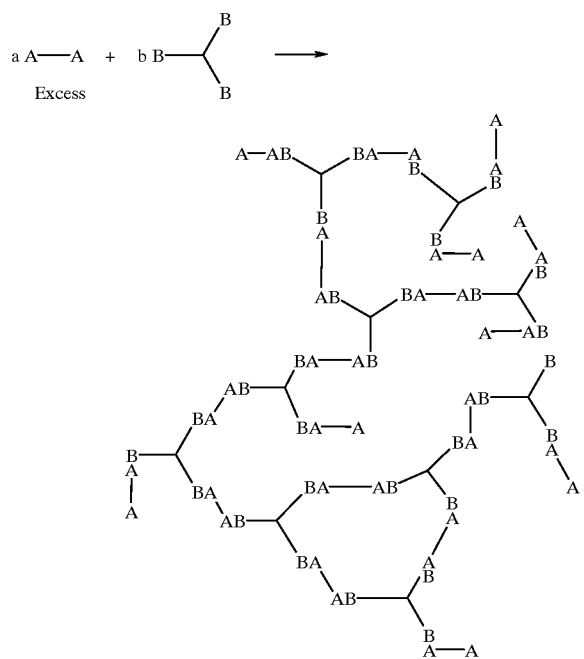

wherein "a" represents the number of $A_2$ molecules and "b" represents the number of $B_3$ molecules.

Similar equations can also be written for other corresponding examples in which the parameters x and y may have other values.

For example, in accordance with this invention, a hyperbranched polycarbosilane is synthesized by a hydrosilation reaction of compounds having two or more vinyl, allyl or other homologous functional groups with a dihydrido or polyhydridosilane, wherein at least one of the monomers includes at least three functional groups. An example of such $(A_2+B_3)$ reaction system may be represented by the following equation:

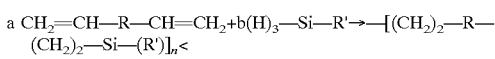

where the end-groups of the resulting polymer may be either $CH=CH_2$ or Si—H depending on the value of the a/b ratio used. In addition to vinyl-functionalized monomers, other monomers containing —$CH_2$—$CH=CH_2$, —C≡CH, —CH=CH— or other corresponding unsaturated groups could also be used, while both R and R' may or may not contain silicon. Also, other combinations of di- and/or polyfunctional (e.g., tri-, tetra, etc.) monomers having functional groups of the same type (e.g., hydrosilyl, vinyl, allyl, etc.) may be used. Some specific examples of applicable silicon-containing unsaturated monomers include diallyldimethylsilane, diallyldiphenylsilane, divinyldichlorosilane, divinyldimethylsilane, divinyltetramethyldisilane, 1,4-divinyltetramethyldisilylethylene, trivinylchlorosilane, trivinylethoxysilane, trivinylmethoxysilane, trivinylmethylsilane, tetraallylsilane, tetravinylsilane, various arylenedivinylsilanes, such as p- or m-phenylenetetraalkyldivinylsilanes, p- or m-phenylenetetraalkyldiallylsilanes, etc. Some examples of corresponding non-silicon-containing monomers include diallyl ether, diallyl maleate, diallyl phtalate, diallyl dicarbonate, diallyl succinate, divinylbenzene, triallyl benzenetricarboxylate, trivinylcyclohexane, etc. If monomers such as 1,3-divinyl-1,3-diphenyl-1,3-dimethyldisilazene,1,3-divinyltetramethyldisilazene, 1,3,5-trivinyl-1,3,5-trimethylcyclotrisilazene, tris(dimethylvinylsilyl)amine, or alike are used, corresponding polycarbosilazenes will be obtained. Some examples of silane monomers include dimethylsilane, diethylsilane, diphenylsilane, phenylmethylsilane, methylsilane, phenylsilane, 1,3-disilabutane (i.e., 1-methyldisilmethylene), 1,1,3,3-tetramethyldisilazane, 1,1,4,4-tetramethyldisilethylene, etc.

In accordance with this invention, a hyperbranched polycarbosiloxane is synthesized by a hydrosilation reaction of compounds having two or more vinyl, allyl or other homologous functional groups with a dihydrido- or polyhydridosilane or siloxane, wherein at least one of the monomers includes at least three functional groups. Examples of such $(A_2+B_3)$ or $(A_2+B_4)$ reaction systems may be represented by the following equations:

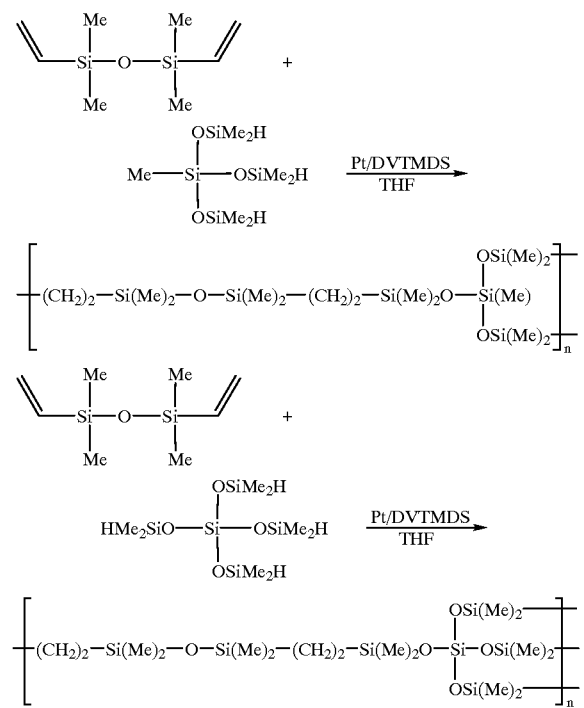

Some specific examples of applicable siloxane monomers include 1,3-diallyltetrakis(trimethylsiloxy)disiloxane, 1,3-diallyltetramethyldisiloxane, 1,3-divinyl-1,3-dimethyl-1,3-dichlorodisiloxane, 1,3-divinyl-1,3-diphenyl-1,3-dimethyldisiloxane, 1,5-divinyl-3,3-diphenyltetramethyltrisiloxane, 1,5-divinylhexamethyltrisiloxane, 1,5-divinyl-3-phenylpentamethyltrisiloxane, 1,3-divinyltetraethoxydisiloxane, divinyltetrakis(trimethylsiloxy)disiloxane, 1,3-divinyltetramethyldisiloxane, divinyltetraphenyldisiloxane, tris(vinyldimethylsiloxy)methylsilane, tris(vinyldimethylsiloxy)phenylsilane, 1,3,5-trivinyl-1,1,3,5,5-pentamethyltrisiloxane, 1,3,5-trivnyl-1,3,5-trimethylcyclotrisiloxane, 1,1,3,3-tetramethyldisiloxane, methyltris(dimethylsiloxy)silane, phenyltris(dimethylsiloxy)silane, methylhydrocyclosiloxanes, tetrakis(dimethylsiloxy)silane, etc. Combinations of these monomers and monomers listed above for the preparation of polycarbosilanes and/or polycarbosilazenes will lead to formation of a variety of different block- or segmented-poly(carbosilane-carbosiloxane), poly(carbosilane-carbosilazene) and/or poly(carbosilazene-carbosiloxane) copolymers.

Hyperbranched polymers are polymers having branches upon branches. More specifically, a hyperbranched polymer contains a mixture of linearly and fully branched repeating units, whereas an ideal dendrimer contains only fully branched repeating units, without any linearly repeating units, and ideal linear polymers contain only linear repeating units, without any branched repeating units. The degree of branching (DB), which reflects the fraction of branching sites relative to a perfectly branched system (i.e., an ideal dendrimer), for a hyperbranched polymer is greater than zero and less than 1, with typical values being from about 0.25 to 0.45.

The average degree of branching ($\overline{DB}$) is defined as the number average fraction of branching groups per molecule, i.e., the ratio of terminal groups plus branched groups to the total number of terminal groups, branched groups, and linear groups. For ideal dendrons and dendrimers the degree of branching is 1. For ideal linear polymers the degree of branching is 0. The degree of branching is expressed mathematically as follows:

$$\overline{DB} = \frac{N_t + N_b}{N_t + N_b + N_l}$$

where $N_t$ represents the number of terminal units, $N_b$ represents the number of branched units, and $N_l$ represents the number of linear units.

Unlike ideal dendrimers which have a polydispersity near 1, hyperbranched polymers have a polydispersity that increases with increasing molecular weight, with typical polydispersities being greater than 1.1 even at a relatively low molecular weight such as 1,000 Daltons, and with polydispersities greater than 2 being typical for hyperbranched polymers having a molecular weight of about 10,000 Daltons or higher. These differences between the polydispersities and degree of branching of hyperbranched polymers verses dendrimers is indicative of the relatively higher randomness and irregularity of hyperbranched polymers as compared with dendrimers, and distinguishes hyperbranched polymers from dendrimers.

An important aspect of this invention relates to control of the polymerization process to prevent gelation (i.e., crosslinking) of the copolymer. For the copolymerization processes of this invention, the ratio (r) of A-groups to B-groups (r=A/B), and/or the extent of reaction (p) are selected so as to avoid gelation. A hyperbranched polymerization system can be approximately modeled by assuming that (a) A-groups only react with B-groups, and B-groups only react with A-groups, (b) cyclization reactions do not occur, (c) all A-groups exhibit equal reactivity regardless of the size and shape of the molecule to which they are attached, and (d) all B-groups exhibit equal reactivity regardless of the size and shape of the molecule to which they are attached. Using these assumptions for the general system $A_x+B_y$, it can be theoretically determined that complete conversion of the minor component can be achieved without gelation if $1/[(x-1)(y-1)] \geq r \geq (x-1)(y-1)$. As an example, complete conversion of the minor component can be achieved for an $A_2+B_3$ system without gelation when the ratio of A-groups to B-groups is less than 0.5 or greater than 2. As an alternative, gelation can be avoided by controlling the extent of conversion (completion) of the reaction. As an example, for an $A_x+B_y$ system, it can be theoretically determined that gelation can be avoided when r=1 (i.e., the number or concentration of A-groups is equal to the number or concentration of B-groups) if the extent of reaction (p) is less than $[1/(x-1)(y-1)]^{1/2}$. For example, for an $A_2+B_3$ system in which the number of A and B groups are equal, gelation can be avoided if the reaction is terminated at or below about 70% completion. Methods of quenching, or otherwise stopping a polymerization reaction at a desired extent of conversion are known and will not be described in detail.

Generally, gelation can be avoided by selecting the extent of reaction (p), the ratio of A-groups to B-groups (r), the number of A-functional groups per molecule of A-functional monomer (x), and the number of B-functional groups per molecule of B-functional monomer (y) so that the relation $rp^2 \leq 1/[(x-1)(y-1)]$. In the case where either A-groups or B-groups are in excess (i.e., $r \neq 1$), the extent of reaction (p) is determined with respect to the minor reactant (the lesser of A and B).

Because the above relationships are dependent on assumptions that only approximate real systems, the actual degree of conversion that can be achieved for a given ratio of A-groups to B-groups before gelation occurs tends to be slightly higher than the theoretically predicted conversion. However, the theoretically determined conversion is an excellent starting point from which to conduct experiments to determine the actual allowable extent of conversion before gelation occurs. Similarly, the allowed ranges for the ratio of A-groups to B-groups for a given extent of conversion without the occurrence of gelation for a real system may be somewhat broader than the theoretically predicted ranges. However, the theoretically predicted ranges provide an excellent starting point for a series of experiments to determine how close to r=1 a system can be before gelation occurs.

Suitable reaction conditions, such as temperature, pressure and solvents, and suitable catalysts are the same as those used for conventional hydrosilation reactions. These conditions and catalysts are well known and will not be described in detail.

The polymerization processes of this invention may be performed using bulk or solution polymerization techniques. The monomers may be added to a reaction vessel either together or separately, and may be added all at once, incrementally, or continuously. The copolymerization reactions of this invention are preferably achieved as a batch process in a single reaction vessel. However, it is contemplated that the processes of this invention may be amenable to continuous reaction processes, such as continuous stirred tank reactors and plug flow reactors. However, the processes of this invention do not encompass an iterative sequence of reactions and separations of the type associated with the synthesis of dendrimers.

The hyperbranched polymers prepared by the processes of this invention will typically have a degree of branching of less than 55%, and more typically from about 25% to about 45%. Their typical polydispersities may range from about 1.1 for lower molecular weight hyperbranched polymers (e.g., those having a molecular weight of about 1,000 Daltons) to 2 or higher for higher molecular weight hyperbranched polymers (e.g. those having a molecular weight of 10,000 Daltons or more). The hyperbranched polymers that are prepared in accordance with the processes of this invention typically have a weight average molecular weight of about 25,000 Daltons or less. However, higher molecular weight hyperbranched polymers can be prepared. The typical molecular weights for the hyperbranched polymers prepared in accordance with this invention are from about 1,000 (weight average) to about 25,000 (weight average), and more typically from about 1,000 to about 10,000 Daltons (weight average).

The hyperbranched polycarbosilanes, polycarbosiloxanes, polycarbosilazenes and copolymers thereof of this invention may be prepared by combining a di- or poly-, vinyl or allyl-functionalized monomer with a di- or polyhydrido-functionalized monomer under suitable conditions for effecting polymerization via hydrosilation reactions, with the number of vinyl and/or allyl groups exceeding the number of hydrido groups to provide a vinyl or allyl terminated hyperbranched polymer or with the number of hydrido groups exceeding the number of vinyl or allyl groups to provide a hydrido-terminated hyperbranched polymer.

The surface functional groups (i.e., terminal groups) of the hyperbranched polycarbosilanes, polycarbosiloxanes, polycarbosilazenes and copolymers thereof of this invention can be chemically modified to provide generally any desired surface functionality. Surface functionality can be modified to facilitate subsequent reactions and/or to impart desired solubility or other application properties, such as sensory, catalytic, etc. For example, a hydrido-terminated hyperbranched polycarbosilane may be reacted with a vinyl or allyl-functional silane or siloxane having one or more hydrolyzable groups (e.g, methoxy- or ethoxy-groups) bonded to a silicon atom to form a hyperbranched polycarbosilane that can be cured (cross-linked) via hydrolysis/condensation reactions upon exposure to moisture.

In general, the hyperbranched polycarbosilanes, polycarbosiloxanes, polycarbosilazenes and copolymers thereof of this invention may be covalently connected to each other to form a nano-domain-structured network using alpha,omega-telechelic linear polymers or oligomers, multi-functional linear polymers with functional groups pendant to the main chain backbone, and/or multi-functional randomly branched polymers having functional groups regularly or randomly distributed in the main or in the side chains. Other types of connectors may include di- or multi-functional low molecular weight compounds that can react with hyperbranched polymer end groups. Connectors may also include multi-arm star polymers, dendrimers, dendrons, homologously derivatized or other hyperbranched polymers, or other architecturally specific macromolecules. Nano-domain networks formed from the hyperbranched polycarbosilanes, polycarbosiloxanes, polycarbosilazenes and copolymers thereof of this invention may be viewed as three-dimensional, cross-linked materials comprising covalently bonded nanoscopic, hyperbranched domains which may be of the same or different chemical composition than the rest of the network. These materials may be formed into clear, transparent films, sheets, membranes, coatings or other objects, and may exhibit glass transition temperatures that may rank them among either elastomers or plastomers. The materials may also exhibit high thermal stability, mechanical strength and toughness, and may offer new ways of preparing specialty membranes, protective coatings, photoresists, novel composites, controlled porosity materials, etc. Other applications may be found in biomedical areas, medical science and engineering, purification of liquids and gases, food processing, storage and packaging, printing and lithography, sensors, catalysts, etc. In many applications, such as coatings, the hyperbranched polymers may exhibit lower viscosity at any given solids content as compared with conventional compositions using linear or lightly branched polymers, and in contrast to dendrimers may exhibit desirable shear-thinning properties for certain applications.

The following examples are illustrative of particular embodiments of the invention.

EXAMPLE 1

A hyperbranched polycarbosiloxane, designated HB-DVTMDS-TDMSS-(SiMe$_2$H)$_x$, was prepared from Si(OSiMe$_2$H)$_4$ and (CH$_2$=CHSiMe$_2$)$_2$O(an A$_4$+B$_2$ system). A 100 mL round bottom flask was charged with Si(OSiMe$_2$H)$_4$ (10.58 g, 32.19 mmol) and (CH$_2$=CHSiMe$_2$)$_2$O(4.00 g, 21.46 mmol) and anhydrous THF (20 mL). After flushing with N$_2$, 0.0204 g solution of Platinum-divinyltertramethyldisiloxane complex in xylene (Karstedt catalyst) (~2% platinum in xylene) was added. The solution was stirred for 15 minutes at room temperature. It was then heated to reflux for 16 hours. Volatiles were removed by a rotavap. The residue was washed by acetonitrile (5×20 mL) and dried in vacuum for 16 hours to give a slightly yellowish oil (11.64 g). $^1$H NMR in CDCl$_3$: 0.043 ppm to 0.211 ppm (m, [Si(CH$_3$)]); 0.46 ppm (s, [—(CH$_2$)$_2$—); 0.51 ppm (s, [—(CH$_2$)$_2$—]); 1.04 ppm [d,(C$\underline{H}_3$CH)]; 4.73 ppm [broad, (SiH)]. $^{13}$C{$^1$H} NMR in CDCl$_3$: −1.22 ppm to 1.19 ppm (m, [Si(CH$_3$)$_2$]); 9.37 ppm to 9.72 ppm (m, [—(CH$_2$)$_2$—]). $^{29}$Si{$^1$H} NMR in CDCl$_3$: −108.73 ppm to −107.13 ppm (m, [Si(O—)$_4$]); −24.46 ppm (broad, [(—O)Si(CH$_3$)$_2$(O—)]); −10.49 ppm to −8.20 ppm [m, (SiH)]; 3.94 ppm to 7.03 ppm (m, [(—CH$_2$CH$_2$)Si(CH$_3$)$_2$(O—)]). Integral ([Si(O—)$_4$]:[(—CH$_2$CH$_2$)Si(CH$_3$)$_2$(O—)]:[SiH]:[(—O)Si(CH$_3$)$_2$(O—)]1:3.46:2.33:0.22. IR on KBr disc (selected assignments): v(Si—H) 2133 cm$^{-1}$. GPC [Column set: Plgel C(2 columns), PLgel 100A, Plget 50 A. Solvent: toluene. Standards: polystyrene 800–300,000]:Mn 1350; Mw 2913; Polydispersity 2.16. $^{-1}$H NMR spectra showed the presence of trace amount of (C$\underline{H}_3$CH) group, indicating trace amount of alpha addition product. $^{29}$Si{$^1$H} NMR spectra showed the presence of trace amounts of (—O)Si(CH$_3$)$_2$(O—) moiety, which may be due to dehydrogenation in the presence of trace amount of water.

EXAMPLE 2

The polymer from Example 1, HB-DVTMDS-TDMSS-(SiMe$_2$H)$_x$, was cured with an alpha,omega-telechelic vinyl-terminated polydimethylsiloxane having the formula CH$_2$=CHSiMe$_2$O(SiMe$_2$O)$_n$SiMe$_2$CH=CH$_2$ (MW 62,700, 1.20 g) was dissolved in 2 mL hexanes in a 15 mL vial. To this solution was added: 0.1 mL hexanes solution of 3-methyl-1-pentyn-3-ol (0.30 g/mL); 0.1 mL hexanes solution of Platinum-divinyltertramethyldisiloxane complex in xylene (Karsteadt catalyst) (~2% platinum in xylene) (0.20 g xylene solution in 1 mL hexanes); HB-DVTMDS-TDMSS-(SiMe$_2$H)$_x$ (0.30 g) in 1.5 mL THF; and 0.1 mL THF solution of (3-glycidoxypropyl)trimethoxysilane (0.25 g/mL). The resulting solution was cast on a Ti coated PET plate, cured for 20 minutes at 120° C. to yield an insoluble clear coating.

EXAMPLE 3

A dimethylsilyl-terminated hyperbranched polycarbosiloxane, designated HB-DVTMDS-MTDMSS-(SiMe$_2$H)$_x$ was prepared from MeSi(OSiMe$_2$H)$_3$ and (CH$_2$=CHSiMe$_2$)$_2$O(an A$_3$+B$_2$ system). A 100 mL round bottom flask was charged with MeSi(OSiMe$_2$H)$_3$ (9.22 g, 34.32 mmol), (CH$_2$=CHSiMe$_2$)$_2$O(4.00 g., 21.46 mmol) and anhydrous THF (20 mL). After flushing with N$_2$ 0.0130 g solution of Platinum-divinyltertramethyldisiloxane complex in xylene (Karstedt catalyst) (~2% platinum in xylene) was added. The solution was stirred for 15 minutes at room temperature, and then heated at reflux for 20 hours. Volatiles were removed by a rotavap. The residue was washed with acetonitrile (5×20 mL) and dried in vacuum for 16 hours to give a slightly yellowish oil (8.78 g). $^1$H NMR in CDCl$_3$: 0.011 ppm to 0.039 ppm (m, [(CH$_3$)$_2$Si]); 0.076 ppm (s, [(CH$_3$)Si(O—)$_3$]) and 0.080 ppm (s, [(CH$_3$)Si(O—)$_3$]); 0.192 ppm (d, [(C$\underline{H}_3$)SiH]); 0.502 ppm (s, [—(CH$_2$)$_2$—]); 0.440 ppm (s, [—(CH$_2$)$_2$—]); 1.03 ppm [d, (C$\underline{H}_3$CH)]; 4.72 ppm [septet, (SiH)]. $^{13}$C{$^1$H} NMR in CDCl$_3$: −2.75 to 1.19 ppm [m, (CH$_3$)]; 9.51 to 9.78 ppm (m, [— (CH$_2$)$_2$—]). $^{29}$Si{$^1$H} NMR in CDCl$_3$: −63.87 ppm to −61.85 ppm (m, [(CH$_3$Si(O—)$_3$]); −20.83 to 19.06 ppm (m, [(—O)Si(CH$_3$)$_2$(O—)]); −6.28 ppm to −5.29 ppm [m, (SiH)]; 8.72 ppm to 10.25 ppm (m, [(—CH$_2$CH$_2$)Si(CH$_3$)$_2$(O—)]) Integral {[(CH$_3$)Si(O—)$_3$]: [(—CH$_2$CH$_2$)Si(CH$_3$)$_2$(O—)]: [SiH]: [—O)Si(CH$_3$)$_2$(O—)]} 1: 3.22: 1.46: 0.18. IR on KBr disc (selected resonance): 2130 cm$^{-1}$ [v(Si—H)]. GPC [Column set:Plgel C(2 columns), PLgel 100A, Plgel 50 A. Solvent: toluene. Standards: polystyrene800–300,000]:Mn 955. Mw 2924. Polydispersity 3.059. $^1$H NMR spectra showed the presence of trace amounts of (C$\underline{H}_3$CH) group, indicating trace amounts of alpha addition product. $^{29}$Si{$^1$H} NMR spectra showed the presence of trace amounts (—O)Si(CH$_3$)$_2$(O—) moiety, which may be due to dehydrogenation in the presence of trace amounts of water.

EXAMPLE 4

The polymer from Example 3, HB-DVTMDS-MTDMSS-(SiMe$_2$H)$_x$, was cured with an alpha,omega-telechelic vinyl-terminated polydimethylsiloxane having the formula CH$_2$=CHSiMe$_2$O(SiMe$_2$O)$_n$SiMe$_2$CH=CH$_2$ (MW 62,700, 1.00 g) was dissolved in 1.5 mL octane in a 15 mL vial. To this solution was added: two drops of 3-methyl-1-pentyn-3-ol; two drops of solution of Platinum-divinyltertramethyldisiloxane complex in xylene (Karstedt catalyst) (~2% platinum in xylene); HB-DVTMDS-MTDMSS-(SiMe$_2$H)$_x$ (0.25 g); and 2 drops of (3-glycidoxypropyl)trimethoxysilane. The resulting solution was cast on a Ti coated PET plate, cured for 12 hours at 120° C. to yield an insoluble clear coating.

EXAMPLE 5

A dimethylsilyl-terminated hyperbranched polycarbosiloxane, designated HB-DVTPHDS-TDMSS-(SiMe$_2$H)$_x$, was prepared from Si(OSiMe$_2$H)$_4$ and (CH$_2$=CHSiPh$_2$)$_2$O(an A$_4$+B$_2$ system). A 100 mL round bottom flask was charged with Si(OSiMe$_2$H)$_4$(2.34 g, 7.13 mmol), (CH$_2$=CHSiPh$_2$)$_2$O(2.11 g, 4.60 mmol) and anhydrous THF (10 mL). After flushing with N$_2$, 0.010 g solution of Platinum-divinyltertramethyldisiloxane complex in xylene (Karstedt catalyst) (~2% platinum in xylene) was added. The solution was stirred for 2 minutes at room temperature, and then heated at reflux for 15 hours. Volatiles were removed-on-a rotavap, and the residue was washed by acetonitrile (5×20 mL) and dried in vacuum for 24 hours to give a slightly yellowish viscous oil (1.52 g). $^1$H NMR in CDCl$_3$: 0.24 to 0.40 ppm m, [Si(CH$_3$)]); 0.60 to 0.69 ppm (broad and m, [—(CH$_2$)$_2$—]); 0.75 to 0.85 ppm (broad and m, [—(CH$_2$)$_2$—]); 1.05 to 1.21 ppm [broad and m, unidentified]; 1.34 to 1.44 ppm [broad and m, unidentified]; 4.80 to 4.95 ppm [m, (SiH)]; 7.41 to 7.50 [m, (C$_6$H$_5$)]; 7.67 to 7.79 ppm [m, (C$_6$H$_5$)]. $^{13}$C{$^1$H} NMR in CDCl$_3$: −1.23 to 0.94 ppm (m, [Si(CH$_3$)]); 6.95 ppm (s, [—(CH$_2$)$_2$—]; 7.08 ppm (shoulder, [—(CH$_2$)$_2$—]); 7.42 ppm (broad, [—(CH$_2$)$_2$—]); 9.20 ppm (s, [—(CH$_2$)$_2$—]); 9.34 ppm (shoulder, [—(CH$_2$)$_2$—]); 9.67 ppm (broad, [—(CH$_2$)$_2$—]);

77.11 to 77.96 [weak m overlaps with CDCl$_3$, unidentified]; 127.68 to 128.21 ppm [m, (C$_6$H$_5$)]; 129.52 to 129.99 ppm [m, (C$_6$H$_5$)]; 134.37 to 135.04 ppm [m, (C$_6$H$_5$)]; 136.47 to 137.00 ppm [m, (C$_6$H$_5$)]. $^{29}$Si{$^1$H} NMR in CDCl$_3$: −103.43 to −101.83 ppm (m, {Si(O—)$_4$}); −19.15 ppm (s, [(—O)Si (CH$_3$)$_2$(O—)]); −8.23 ppm [m, (Ph$_2$Si)]; −4.03 to −3.19 ppm [s, (SiH)]; 11.06 to 12.30 ppm (m, [(—CH$_2$CH$_2$) Si(CH$_3$)$_2$ (O—)]). Integral {[Si(O—)$_4$]:[(—CH$_2$CH$_2$)Si (CH$_3$)$_2$(O—)]:[Ph$_2$Si]:[SiH]:[(—O)Si(CH$_3$)$_2$(O—)]} 1:2.56:2.71:2.29:0.41. IR on KBr disc (selected resonance): 2131 cm$^{-1}$ [v(SiH)]. GPC (Column set: Plgel C(2 columns), PLgel 100 A, Plgel 50 A. Solvent: toulene. Standards: polystyrene800–300,000):Mn 1432. Mw 2960. Polydispersity 2.07. $^{29}$Si{$^1$H} NMR spectra showed the presence of trace amounts (—O)Si(CH$_3$)$_2$(O—) moiety, which may be due to dehydrogenation in the presence of trace amounts of water.

EXAMPLE 6

The polymer of Example 5, HB-DVTPHDS-TDMSS-(SiMe$_2$H)$_x$, was cured with an alpha-omega-telechelic dimethylvinylsilyl-terminated polydimethylsiloxane, having the formula CH$_2$=CHSiMe$_2$O(SiMe$_2$O)$_n$SiMe$_2$CH=CH$_2$ (MW 62,700, 1.20 g), was dissolved in 2 mL hexanes in a 15 mL vial. To this solution was added: 0.1 mL hexanes solution of 3-methyl-1-pentyn-3-ol (0.30 g/mL); 0.1 mL hexane solution of Platinum-divinyltertramethyldisiloxane complex in xylene (Karstedt catalyst) (~2% platinum in xylene) (0.20 g xylene solution in 1 mL hexanes); HB-DVTPHDS-TDMSS-(SiMe$_2$H)$_x$ (0.30 g) in 1.5 THF; and 0.1 mL THF solution of (3-glycidoxypropyl) trimethoxysilane (0.25 g/mL). The resulting solution was cast on a Ti coated PET plate, cured for 20 minutes at 120° C. to yield insoluble clear coating.

EXAMPLE 7

A dimethylsilyl-terminated hyperbranched polycarbosiloxane, having the designation HB-DVDPHDMDS-TDMSS(SiMe$_2$H)$_x$, was prepared from Si(OSiMe$_2$H)$_4$ and (CH$_2$=CHSiPhMe)$_2$O(an A$_4$+B$_2$ system). A 100 mL round bottom flask was charged with Si(OSiMe$_2$H)$_4$ (3.28 g, 9.98 mmol), (CH$_2$=CHSiPhMe)$_2$O (2.00 g, 6.44 mmol) and anhydrous THF (10 mL). After flushing with N$_2$, 0.010 g solution of Platinum-divinyltertramethyldisiloxane complex in xylene (Karstedt catalyst) (about 2% platinum in xylene) was added. The solution was stirred for 2 minutes at room temperature, and then heated at reflux for 15 hours. Volatiles were removed on a rotavap, and the residue was washed by acetonitrile (5×20 mL) and dried in vacuum for 24 hours to give a slightly yellowish viscous oil (2.25 g). $^1$H NMR in CDCl$_3$: 0.03 to 0.29 ppm (m, [Si(CH$_3$)]); 0.40 to 0.98 ppm (m, [—(CH$_2$)$_2$—]); 4.81 ppm [septet, (SiH)]; 7.43 ppm [b, (C$_6$H$_5$)]; 7.62 ppm [b, (C$_6$H$_5$)]. $^{13}$C{$^1$H} NMR in CDCl$_3$: −1.71 to 0.79 ppm (m with a strong peaks at 0.40 ppm, [Si(CH$_3$)]); 0.79 to 9.46 ppm (m with two strong peaks at 8.55 ppm(s) and 9.46 ppm(s), [—(CH$_2$)—)$_2$—]); 127.64 ppm (s with a shoulder 127.51 ppm, (C$_6$H$_5$)]; 129.18 ppm [s, (C$_6$H$_5$)]; 133.38 ppm [s with a shoulder 133.26 ppm, (C$_6$H$_5$)]; 138.73 ppm [s, (C$_6$H$_5$)]; 139.09 ppm [s, (C$_6$H$_5$)]. $^{29}$Si{$^1$H} NMR in CDCl$_3$: −108.88 to −103.39 ppm, [Si(O—)$_4$]); −24.57 ppm (broad, [(—O)Si(CH$_3$)$_2$(O—)]); −9.60 to −8.73 ppm [m, (SiH)]; −4.54 [s with a shoulder −4.31 ppm, (SiPhMe)]; −5.17 ppm [s, (SiPhMe)]; 5.57 to 6.80 ppm (m, [(—CH$_2$CH$_2$) Si(CH$_3$)$_2$(O—)]). Integral {[Si(O—)$_4$]:[(—CH$_2$CH$_2$)Si(CH$_3$)$_2$(O—)]:[SiPhMe]: [SiH]:[(—O)Si(CH$_3$)$_2$(O—)]} 1:1.90:2.80:2.37:0.22 IR on KBr disc (selected assignment): 2131 cm$^{-1}$[v(SiH)]. GPC [Column set: Plgel C(2 columns), PLgel 100A, Plgel 50 A. Solvent: toluene. Standards: polystyrene800–300,000]:Mn 605. Mw 2644. Polydispersity 4.37. $^{29}$Si{$^1$H} NMR spectra showed the presence of trace amounts (—O)Si(CH$_3$)$_2$(O—) moiety, which may be due to dehydrogenation in the presence of trace amounts of water.

EXAMPLE 8

The polymer from Example 7, HB-DVDPHDMDS-TDMSS-(SiMe$_2$H)$_x$, was cured with an alpha-omega-telechelic dimethylvinylsilyl-terminated polydimethylsiloxane, CH$_2$=CHSiMe$_2$O(SiMe$_2$O)$_n$SiMe$_2$CH=CH$_2$(MW 62,700, 0.60 g) was dissolved in 1 mL hexanes in a 15 mL vial. To this solution was added: 0.05 mL hexanes solution of 3-methyl-1-pentyn-3-ol (0.30 g/mL); 0.05 mL hexanes solution of Platinum-divinyltertramethyldisiloxane complex in xylene (Karstedt catalyst) (about 2% platinum in xylene) 0.20 g xylene solution in 1 mL hexanes); HB-DVDPHDMDS-TDMSS-(SiMe$_2$H)$_x$ (0.15 g) in 0.75 mL THF; and 0.05 mL THF solution of (3-glycidoxypropyl)trimethoxysilane (0.25 g/mL). The resulting solution was cast on a Ti coated PET plate and cured for 20 minutes at 120° C. to yield an insoluble clear coating.

EXAMPLE 9

A dimethylvinylsilyl-terminated hyperbranched polycarbosiloxane, designated HB-DVTMDS-TDMSS-(SiMe$_2$Vi)$_x$, was prepared from Si(OSiMe$_2$H)$_4$ and (CH$_2$=CHMe$_2$)$_2$O (an A$_4$+excess B$_2$ system). A 100 mL bottom flask was charged with Si(OSiMe$_2$H)$_4$ (3.00 g, 9.13 mmol), (CH$_2$=CHSiMe$_2$)O (10.55 g, 56.69 mmol) and anhydrous THF (20 mL). After flushing with N$_2$ 0.0200 g solution of Platinum-divinyltertramethyldisiloxane complex in xylene (Karstedt catalyst) (about 2% platinum in xylene) was added. This solution was stirred for 15 minutes at room temperature, and then heated at reflux for 20.5 hours. Volatiles were removed on a rotavap, and the residue was washed by acetonitrile (4×40 mL) and dried in vacuum for 3 days to give a slightly yellowish oil (6.76 g). $^1$H NMR in CDCl$_3$: 0.051 ppm (s, [SiCH$_3$]); 0.064 ppm (s, [Si(CH$_3$)]); 0.089 ppm (s, [Si(CH$_3$)]); 0.139 ppm (s, Si(CH$_3$)]); 0.46 ppm (s, [—(CH$_2$)$_2$—]); 0.52 ppm (s, [—(CH$_2$)$_2$—]); 1.00 ppm [d, (CH$_3$CH)]; 1.059 ppm [d, (CH$_3$CH)]; 1.066 ppm [d, (CH$_3$CH)]; 5.72 ppm (dd, CH$_2$=CHSi); 5.92 ppm (dd, CH$_2$=CHSi); 6.18 ppm (dd, CH$_2$=CHSi). $^{13}$C{$^1$H} NMR in CDCl$_3$: −0.70 ppm (s, [Si(CH$_3$)]); −0.42 ppm (s, [Si(CH$_3$)]); −0.30 ppm (s, [Si(CH$_3$)]); −0.14 ppm (s, [Si(CH$_3$)]); 9.41 ppm to 9.82 ppm (m, [—(CH$_2$)$_2$—]); 131.43 ppm [s, (CH$_2$=CHSi)]; 139.76 [s, (CH$_2$=CHSi)]. $^{29}$Si{$^1$H} NMR in CDCl$_3$: −105.67 to −104.78 ppm [m, Si(O—)$_4$]; −4.8 ppm [s, (CH$_2$=CHSi)]; 6.97 ppm (s, [Si(CH)]); 7.55 ppm (s, [Si(CH$_3$)]); 8.77 ppm (s with satellites from 8.28 to 9.26 ppm, [Si(CH$_3$)]). Integral {[Si(O—)$_4$]:[(—CH$_2$CH$_2$)Si (CH$_3$)$_2$(O—)]:[CH$_2$=CHSi]]} 1:8.78:1.58. IR on KBr disc (selected assignments): 1995 cm$^{-1}$[v (C=C)]; 1563 cm$^{-1}$ [v(C=C)]. GPC [Column set: Plgel C(2 columns), PLgel 100A, Plgel 50 A. Solvent: toluene. Standards: polystyrene800–300,000]:Mn1397; Mw 9061; Polydispersity 6.49.

EXAMPLE 10

The polymer from Example 9, HB-DVTMDS-TDMSS-(SiMe$_2$Vi)$_x$, was cured with an alpha,omega-telechelic dimethylvinylsilyl-terminated polydimethylsiloxane, $CH_2=CHSiMe_2O(SiMe_2O)_nSiMe_2CH=CH_2$ (MW 62,700, 1.20 g) and HB-DVTMDS-TDMSS-$(SiMe_2Vi)_x$ (0.10 g) was dissolved in 2 mL hexanes in a 15 mL vial. To this solution was added: 0.15 mL hexanes solution of 3-methyl-1-pentyn-3-ol (0.30 g/mL); 0.1 mL hexanes solution of Platinum-divinyltertramethyldisiloxane complex in xylene (Karstedt catalyst) (~2% platinum in xylene) (0.20 g xylene solution in 1 mL hexanes); HB-DVTMDS-TDMSS-$(SiMe_2H)_x$ (0.30 g) in 1.5 mL THF; and 0.1 mL THF solution of (3-glycidoxypropyl)trimethoxysilane (0.25 g/mL). The mixture was stirred on each step of addition. The resulting solution was cast on a Ti coated PET plate and cured for 20 minutes at 120° C. to yield and insoluble clear coating.

EXAMPLE 11

The polymer of Example 3, HB-DVTMDS-MTDMSS-$(SiMe_2H)_x$, was cured with the polymer of Example 9, HB-DVTMDS-TDMSS-$(SiMe_2Vi)_x$, using the following procedure. Polymer HB-DVTMDS-TDMSS-$(SiMe_2Vi)_x$ of Example 9 (0.60 g) was dissolved in 1 mL hexanes in a 15 mL vial. To the solution was added: 0.1 mL hexanes solution of 3-methyl-1-pentyn-3-ol(0.30 g/mL); 0.1 mL hexanes solution of Platinum-divinyltertramethyldisiloxane complex in xylene (Karstedt catalyst) (~2% platinum in xylene) (0.2 g xylene solution in 1 mL hexanes), HB-DVTMDS-TDMSS-$(SiMe_2H)_x$ of Example 3 (0.60 g) in 0.5 mL THF; and 0.1 mL THF solution of (3-glycidoxypropyl) trimethoxysilane (0.25 g/mL). The resulting solution was cast on a Ti coated PET plate, cured for 20 minutes at 120° C. to yield insoluble clear, hard and brittle coating.

These and other objects, advantages and features of the invention will be more fully understood and appreciated by reference to the Description of the Preferred Embodiments and the claims.

The invention claimed is:

1. A hyperbranched polycarbosilane, polycarbosiloxane, polycarbosilazene or copolymer thereof, comprising:

the reaction product of a difunctional or polyfunctional monomer having functional groups of one type (A) without any other functional groups capable of reacting significantly during polymerization, and a difunctional or polyfunctional monomer having functional groups of another type (B) without any other functional groups capable of reacting significantly during polymerization, wherein neither A nor B react with themselves, and each A-functional group is reactive with a B-functional group, and wherein at least one of the monomers has a functionality of at least three.

2. A process for preparing a hyperbranched polycarbosilane, polycarbosiloxane, polycarbosilazene or copolymer thereof, comprising:

reacting a difunctional or polyfunctional monomer having functional groups of one type (A) without any other functional groups capable of reacting significantly during polymerization, with a difunctional or polyfunctional monomer having functional groups of another type (B) without any other functional groups capable of reacting significantly during polymerization, wherein neither A nor B react with themselves, and each of the A-functional groups is reactive with a B-functional group, and wherein at least one of the monomers has a functionality of at least three.

3. The process of claim 2, wherein the extent of reaction (p) determined with respect to the lesser of A-group concentration and B-group concentration, the ratio of A-groups to B-groups (r), the number of A-functional groups per molecule of A-functional monomer (x), and the number of B-functional groups per molecule of B-functional monomer (y) is selected to satisfy the relationship $rp^2 \leq 1[(x-1)(y-1)]$.

4. A hyperbranched polymer network, comprising:

a hyperbranched polycarbosilane, polycarbosiloxane, polycarbosilazene or copolymer thereof in which the molecules thereof are linked to each other to form a nano-domain-structured network.

5. The network of claim 4, wherein the hyperbranched polycarbosilane, polycarbosiloxane, polycarbosilazene or copolymer molecules are linked to each other by reaction with an alpha,omega-telechelic difunctional polymer.

6. The network of claim 4, wherein the hyperbranched polycarbosilane, polycarbosiloxane, polycarbosilazene or copolymer molecules are linked to each other by reaction with a second hyperbranched polymer.

7. The network of claim 6, wherein the second hyperbranched polymer is selected from the group consisting of polycarbosilanes, polycarbosiloxanes, polycarbosilazenes and copolymers thereof.

8. A hyperbranched polycarbosilane, polycarbosiloxane, polycarbosilazene or copolymer thereof comprising:

the reaction product of a diallyl-functionalized monomer, a polyallyl-functionalized monomer, a divinyl-functionalized monomer or a polyvinyl-functionalized monomer and a dihydrosilyl-functionalized monomer or a polyhydrosilyl-functionalized monomer, wherein at least one of the monomers has a functionality of at least three.

* * * * *

UNITED STATES PATENT AND TRADEMARK OFFICE
CERTIFICATE OF CORRECTION

PATENT NO. : 6,384,172 B1
DATED : May 7, 2002
INVENTOR(S) : Dvornic et al.

It is certified that error appears in the above-identified patent and that said Letters Patent is hereby corrected as shown below:

Column 1,
Line 36, "know" should be -- known --;

Column 6,
Line 42, "verses" should be -- versus --;

Column 9,
Lines 13, 48 and 65, "Platinum-divinyltertramethyldisiloxane" should be -- Platinum-divinyltetramethyldisiloxane --;
Line 30, "Plget 50A" should be -- Plgel 50A --;
Line 49, "Karsteadt" should be -- Karstedt --;

Column 10,
Lines 36 and 51, "Platinum-divinyltertramethyldisiloxane" should be -- Platinum-divinyltetramethyldisiloxane --;
Line 67, "(broad,[-($CH_2$)$_2$-)])" should be -- (board,[-($CH_2$)$_2$-]) --;

Column 11,
Lines 28 and 46, "Platinum-divinyltertramethyldisiloxane" should be -- Platinum-divinyltetramethyldisiloxane --;
Line 59, "(s" should be -- [s --;

Column 12,
Lines 18-19 and 37, "Platinum-divinyltertramethyldisiloxane" should be -- Platinum-divinyltetramethyldisiloxane --;
Line 44, "(s,[SiCH$_3$)])" should be -- (s,[Si(CH$_3$)]) --;
Line 45, "(s, Si(CH$_3$)])" should be -- (s,[Si(CH$_3$)]) --;
Line 58, "[$CH_2$ =CHSi]]}" should be -- [$CH_2$ =CHSi]} --;

UNITED STATES PATENT AND TRADEMARK OFFICE
CERTIFICATE OF CORRECTION

PATENT NO.   : 6,384,172 B1
DATED        : May 7, 2002
INVENTOR(S)  : Dvornic et al.

It is certified that error appears in the above-identified patent and that said Letters Patent is hereby corrected as shown below:

<u>Column 13,</u>
Lines 7 and 26, "Platinum-divinyltertramethyldisiloxane" should be -- Platinum-divinyltetramethyldisiloxane --;
Line 14, "and" should be -- an --;

Signed and Sealed this

Twenty-sixth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,384,172 B1
DATED          : May 7, 2002
INVENTOR(S)    : Dvornic et al.

It is certified that error appears in the above-identified patent and that said Letters Patent is hereby corrected as shown below:

<u>Column 14,</u>
Line 21, "$rp^2 \leq 1[(x-1)(y-1)]$" should be -- $rp^2 \leq 1/[(x-1)(y-1)]$ --.

Signed and Sealed this

Twenty-seventh Day of January, 2004

JON W. DUDAS
*Acting Director of the United States Patent and Trademark Office*